Oct. 28, 1941.  P. HEFTLER  2,260,899
HIGH SPEED METHOD OF MAKING METAL-EDGE FILTERS
Filed May 27, 1940  5 Sheets-Sheet 1

Inventor
Paul Heftler

Oct. 28, 1941.    P. HEFTLER    2,260,899
HIGH SPEED METHOD OF MAKING METAL-EDGE FILTERS
Filed May 27, 1940    5 Sheets-Sheet 3

Inventor
Paul Heftler

Oct. 28, 1941.          P. HEFTLER          2,260,899
HIGH SPEED METHOD OF MAKING METAL-EDGE FILTERS
Filed May 27, 1940          5 Sheets-Sheet 4

Inventor
Paul Heftler

FIG. 13.

Patented Oct. 28, 1941

2,260,899

UNITED STATES PATENT OFFICE 2,260,899

HIGH SPEED METHOD OF MAKING METAL-EDGE FILTERS

Paul Heftler, Chicago, Ill.

Application May 27, 1940, Serial No. 337,406

22 Claims. (Cl. 164—21)

The invention described in this specification relates to "metal-edge" or "edge-type" filters, which are filters in which the liquid being filtered is caused to pass through slots lying between the edges of superposed thin metal plates or washers. Filters of this type are shown in United States Letters Patent No. 1,641,485 to Victor R. Heftler and No. 1,977,174 issued to Matthew O. Crawford, and have achieved considerable commercial success, being used as standard equipment on marine engines, tractor engines, Diesel engines, truck engines, expensive passenger car engines, and refrigerating systems, but their more general adoption has been limited by their cost.

The cost of manufacturing this type of filter has been greatly reduced in recent years by the use of the punch press tool or die set shown in United States Letters Patent No. 2,204,592 issued to Victor R. Heftler for forming and assembling the washers of a filter into a filter stack, but their cost is still high in comparison with the cost of filters formed of wire cloth or screen. In the Victor R. Heftler punch press tool, only one washer or spacer of the filter stack is formed during each stroke of the press, so that two strokes are necessary to form a complete layer (a complete layer being the group of washers or of washers and spacers that must be added to a filter stack to create a slot or several small slots that, with the exception of the space that may be occupied by spacers, extend completely around the filter stack).

The principal object of this invention is to provide a method of making the successive layers of a filter stack by assembling each washer with its spacing means to form a complete layer before blanking the washer out of the sheet stock from which it is formed, so that each blanking operation will finish a complete layer of the filter stack.

Another object of this invention is to provide a punch press tool or die set that will make a complete layer of a filter stack at every stroke and which will thus work twice as fast as the Victor R. Heftler punch press tool. Since the cost of operating the die set is a large part of the cost of the filter stack, it is obvious that the attainment of this object will result in lower costs.

One of the principal features of this invention is the process of making a partially formed washer in a strip of stock with spacing means in position on it, and then blanking out the washer and placing the washer and its spacing means on top of similar washers and spacing means. The spacing means may be placed either above or below the washer and may or may not be in contact with it at the beginning of the blanking operation, these details differing in the various forms of the invention.

Another feature of this invention is the provision of a die set for partially forming washers from a sheet of metal stock, placing spacing means either in or in line with their positions on the washers, and blanking the washers out of the stock and placing each washer and its spacing means on top of the previously formed and assembled washers and spacing means.

Other objects and features of this invention will appear from the following description and claims, reference being had to the accompanying drawings, in which:

Before the invention is explained in detail, it is to be understood that the invention is not limited to the particular forms described below and illustrated in the accompanying drawings, since the invention is capable of other embodiments and of being practiced or carried out in other ways. Also, it is to be understood that the particular words used in this specification have been picked to make the invention clear and not to narrow it down, and that the invention includes anything falling within the terms of any of the claims at the end of this specification.

The most important part of this invention is probably the process or method, but this process or method may be most easily understood and appreciated if some of the die sets in which it may be carried out are first described. These die sets belong to the general class of so-called "progressive dies", in which the work to be performed is divided into several operations, and the material is fed, by hand or automatically, so that it is successively submitted to the various operations. During these operations, the piece remains fixed to the mother stock while it is moved from one station to the next, and it is only at the final station, usually called the "blanking out" station, that the final ties are sheared and the completed piece falls through the blanking dies.

Figures 1, 2, 3:
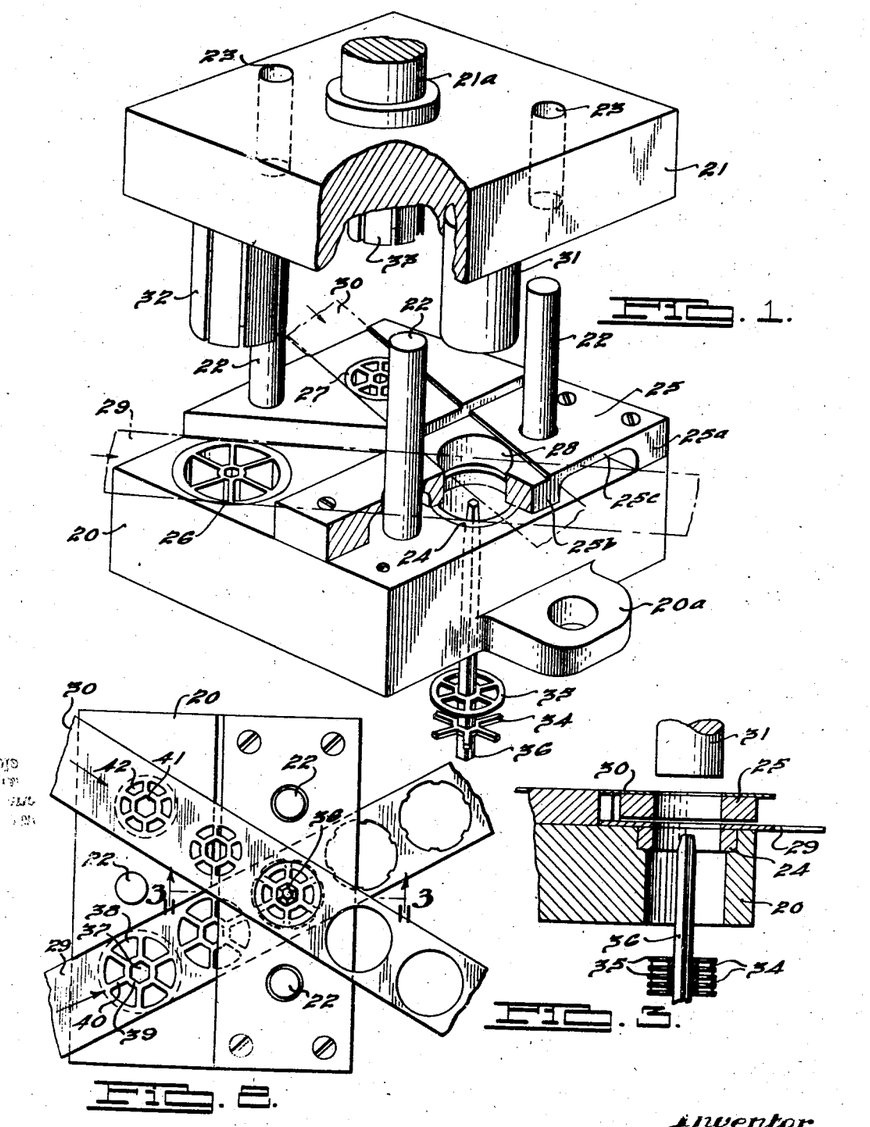
Fig. 1 is an isometric view of one form of die set for carrying out one form of the invention, with the parts separated to more clearly show their structure.
Fig. 2 is a plan view of part of the die set shown in Fig. 1.
Fig. 3 is a section on the line 3—3 of Fig. 2, looking in the direction of the arrows.

The die set shown in Figs. 1 to 3 comprises a die holder 20 and an upper bolster plate or punch holder 21 adapted to be secured to the bolster plate and to the ram, respectively, of an ordinary punchpress of suitable size. For this purpose, the die holder 20 is provided with lugs 20a and the bolster plate 21 is provided with a shank 21a. The die holder 20 is provided with three guide posts 22 which are adapted to fit into guide holes 23 in the punch holder 21 when the tool is assembled. The die holder 20 carries four dies 24, 25, 26, and 27, two of which (24 and 25) are blanking dies. One of the blanking dies 24 is set into the surface of the die holder 20. The other blanking die is in the form of a long plate with feet 25a at its ends secured to the top of the die holder 20. The central portion 25b of the blanking die 25 is thickened so that its lower surface almost touches the upper surface of the die holder 20. This central portion 25b contains a blanking aperture 28 which is directly above the blanking aperture in the lower blanking die 24.

The two pattern dies 26 and 27 are set in the die holder 20 at one side of the blanking dies 24 and 25 and at two different levels, one at the same level as the lower blanking die 24 and the other in a raised portion of the die holder so that it is at the same level as the upper blanking die 25. With this arrangement there are two paths for two strips of stock 29 and 30. The path for one strip 29 passes over the pattern die 26 and then between the two blanking dies 24 and 25. The path for the other strip 30 extends over the raised portion of the die holder 20 and over the upper blanking die 25 and at an angle to the first path, passing over the other pattern die 27 and the aperture 28 in the upper blanking die 25.

The upper bolster plate or punch holder 21 carries three punches, a blanking punch 31 and two pattern punches 32 and 33. The blanking punch 31 is arranged so that, at each stroke of the press, it passes right through the upper blanking die 25 and into the lower blanking die 24, punching out pieces from both the upper and lower strips 30 and 29. Thus one punch 31 cooperates with two dies 24 and 25, while the two pattern punches 32 and 33 are each arranged to cooperate with one of the pattern dies 26 and 27.

In operation, the two strips of stock 29 and 30 are fed step by step, in the direction shown by the arrows in Figures 1 and 2, by a suitable push or roll feed. The die set is designed and the feeds adjusted so that the patterns 34 and 35 punched out by the pattern punches 32 and 33 come directly over the blanking dies 24 and 25 at a later stroke of the press. In the particular embodiment shown in the drawing, this occurs two strokes later. Thus, at each stroke of the press two patterns are punched out at the pattern dies 26 and 27 and two other previously formed patterns 34 and 35 are blanked out at the blanking dies 24 and 25 and drop down onto a hexagonal stem 36 placed immediately below the blanking dies 24 and 25.

As the two pieces blanked out at one stroke of the press have their patterns formed at different dies, these two patterns can be different. This is the important feature of this die set. In the particular die set illustrated, the pattern formed in one strip of stock 29 by one of the pattern dies 26 and its corresponding punch 32 comprises a central hexagonal hole 37 and six holes 38 similar to sectors of a circle around the hexagonal hole. As shown in Fig. 2, this leaves a central ring 39 of stock joined to the remainder of the strip of stock 29 by six radiating arms 40. When the pattern thus formed reaches the blanking dies 24 and 25, the punch 31, whose diameter is a little smaller than the outer diameter of the pattern, cuts off each of the six arms 40 near its outer end, forming a spider or star piece 34, and the piece 34 thus separated from the stock 29 drops down onto the tapered hexagonal stem 36.

The pattern formed at the other pattern die 27 is similar to the one formed at the pattern die 26, having a hexagonal hole 41 and six segmental holes 42 around it. In this pattern, however, the segmental holes are considerably smaller than in the first pattern, so that the over-all diameter of the pattern is smaller than the over-all diameter of the blanking punch 31. Therefore, when this pattern reaches the blanking die 25, the piece 35 punched out contains the entire pattern, so that it has the general appearance of a wheel. Thus, at each stroke of the press, a wheel piece 35 and a star piece 34 are punched out, and these pile up on the stem 36 in alternate order, forming the filtering element or filter stack shown in Fig. 6 and similar to the well-known metal-edge filtering element shown in United States Patent No. 1,641,435 issued to Victor R. Heftler.

It will be noted that when the punch 31 reaches the lower blanking die 24, its face is covered by one of the wheel pieces. At first thought, it would appear that this would interfere with the action of the punch and die, but it has been found in practice that the wheel piece on the face of the punch, even though soft compared to the punch, satisfactorily punches out the star piece.

In punching out the wheel pieces, the upper blanking die 25 yields slightly until it rests upon the top of die holder 20. This yielding is permitted by the thin parts 25c of the die 25 between the feet 25a and the thick center portion 25b. With this arrangement, a solid support is secured for the upper blanking die 25 without the necessity of making it very heavy.

The tool shown in Fig. 1 lends itself very well to the production of a type of filter which hitherto could be assembled only by hand. This is a filtering element in which the wheels and stars are of different thicknesses. For example, if a filter of not extreme fineness is desired, the stars can be punched out of stock .004 inch thick, while the wheels are punched out of stock only .002 inch thick, so that almost two-thirds of the area of the side of the filtering stack will be apertures. This gives considerably more filtering capacity in a given size of stack than can be had with the conventional type of metal-edge filter. Alternately, if an extremely fine filter is required, the stars or spiders can be punched out of stock .001 inch thick while the wheels are punched out of stock .002 inch thick, which is the minimum thickness that will give the necessary stiffness to the edge of the wheels.

It is obvious that many modifications of this die set may be made. For example, the upper blanking die 25 may be omitted and the pattern die 27 placed just above the level of the pattern die 26 and the blanking die 24. This arrangement is illustrated in Figs. 4 and 5, in which the parts are numbered as in Figs. 1-3, the parts which are identical having the same numbers and the parts which are not identical but perform similar functions having different numbers.

Figures 4, 5, 6:
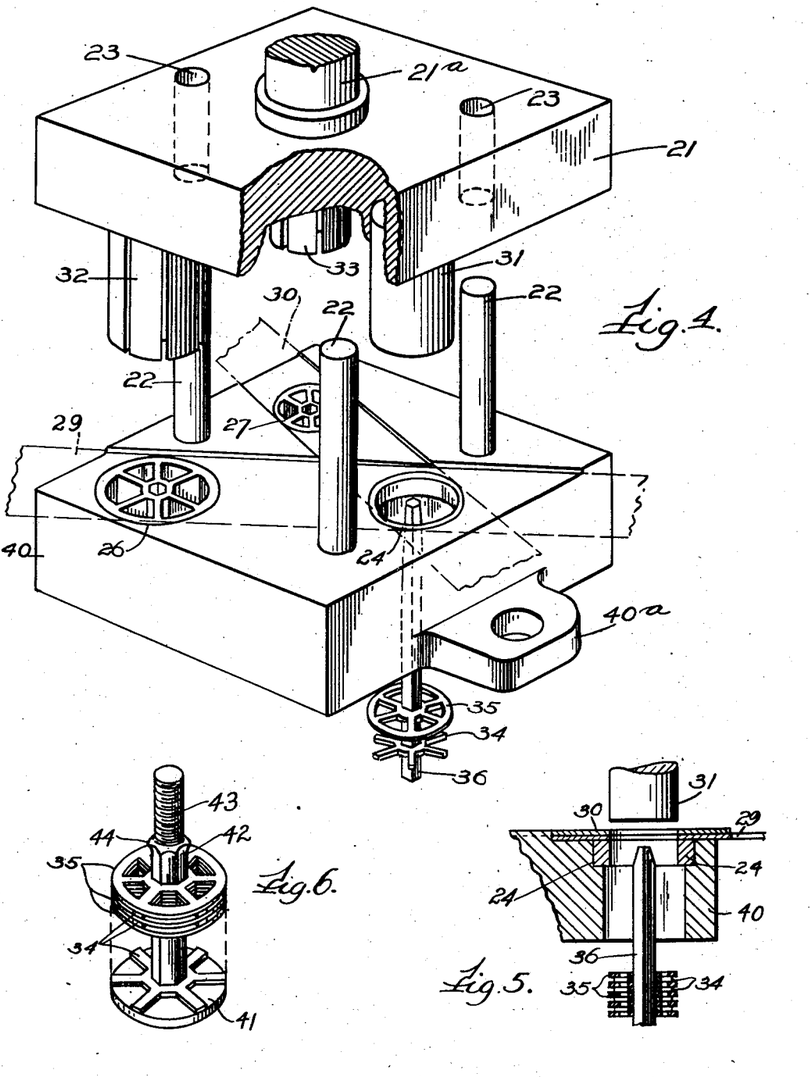
Fig. 4 is an isometric view of another die set slightly different from that shown in Figs. 1 to 3.
Fig. 5 is a section, similar to Fig. 3, of the die set shown in Fig. 4.
Fig. 6 is an isometric view of a filter stack of the type made by the die sets shown in Figs. 1 to 5.

In the construction shown in Figs. 4 and 5, the die holder 40 is formed with two intersecting paths for two strips of stock 29 and 30, but the path for the strip 30 is higher than the path for the strip 29 by a distance which is equal to only the thickness of the stock 29, so that the two strips of stock 29 and 30 are in contact with each other where they cross, as is clearly shown in Fig. 5. With this arrangement, instead of each wheel piece 35 being punched out from its strip of stock 30 before the star piece 34 is punched out from its strip of stock, the two pieces 34 and 35 are in contact with each other in their final assembled relation to each other before they are punched out, and the two pieces 34 and 35 are punched out simultaneously. They are received together on the stem 36, but they are shown separated in Fig. 4 in order that both pieces 34 and 35 may be illustrated more clearly.

After several thousand star and wheel pieces 34 and 35 have been assembled on the stem or rod 36, the stem or rod and the pieces carried by it are removed from the machine, and groups of pieces 34 and 35 of the proper number are removed and placed upon the stem 42 of the final filter stack, shown in Fig. 6. The pieces, of course, are not counted but the proper length of stack, such as half an inch, is measured off, and the group of pieces falling within the desired length is removed as a unit. The hexagonal stem 42 of the finished filter stack is riveted into a thick solid bottom washer 41 which forms the bottom of the filter stack, and its upper end 43 is threaded to enable it to be screwed into a filter head like the filter head 62 shown in Fig. 8. After the pieces 34 and 35 have been placed upon the stem 42, the upper ends 44 of the corners of the hexagonal portion of the stem are peened down in order to permanently retain the washers on the stem.

A second form of filter stack and the process of making it are illustrated in Figs. 7 to 10. In this form of the process, a strip of stock 50 of the desired thickness, such as .002 in., is passed through several successive stations A, B, C and D, at each of which stations one, or a part of one, of the operations comprising the process is carried out. At the first station A, an irregularly shaped hole 51 is punched out. The hole 51 can be regarded as being approximately round with six tongues 52 projecting in towards its center and with a pair of notches 53 extending out from between the tongues 52 at opposite sides of the hole 51. The hole 51 is concentric with a circle 54 which will be the position of the outer edge of the finished washer.

Figures 7, 8:
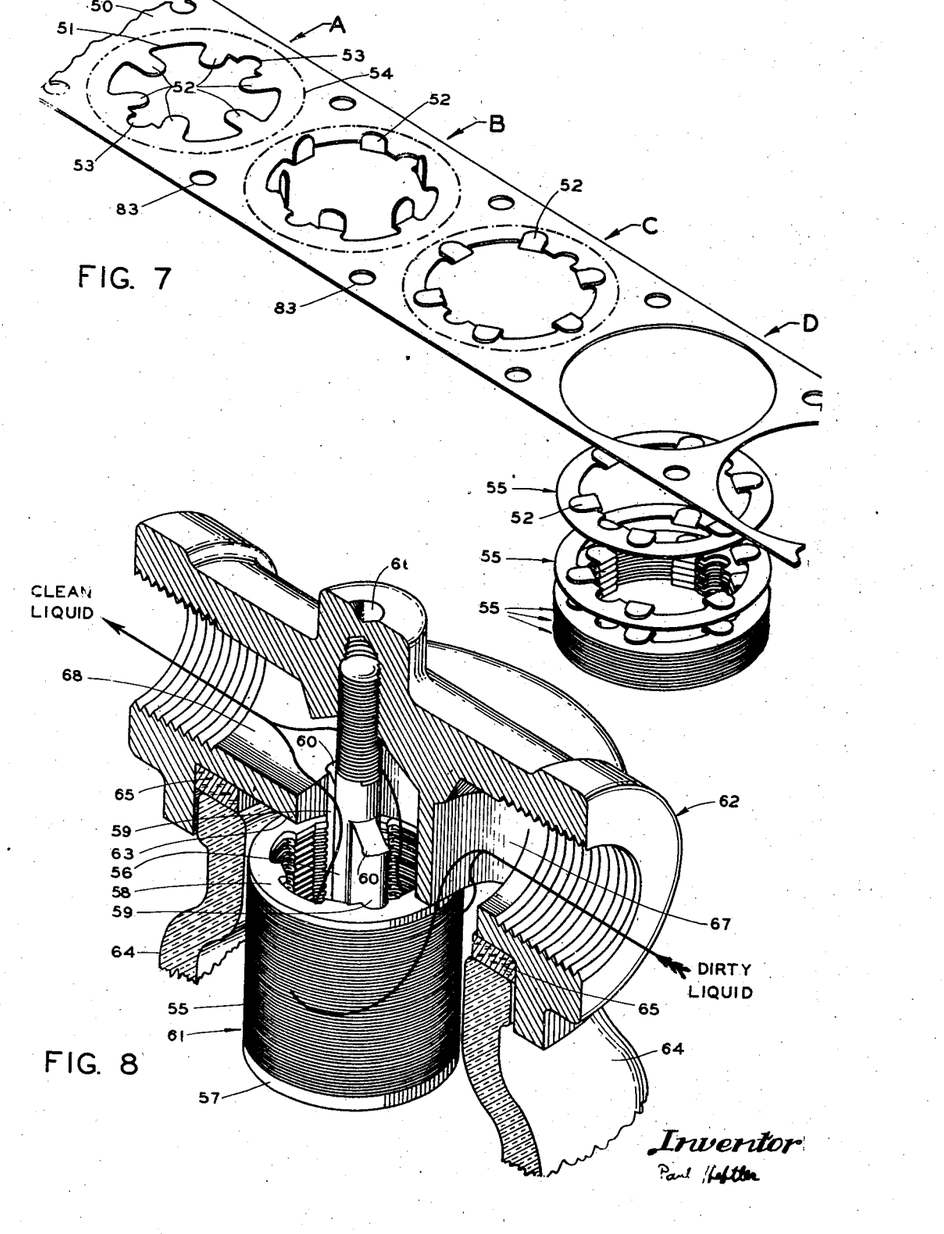
Fig. 7 is an isometric view illustrating the successive steps in making and stacking the layers of a second form of filter stack.
Fig. 8 is an isometric view, partly in section, showing a complete filter stack assembled in a filter, the filter stack being of the type whose layers are made as shown in Fig. 7.

At the second station B, the ends of the six tongues 52 are bent straight up with as sharp a bend as possible between the up-bent portions and the flat portions. At the third station C, the up-bent portions of the tongues 52 are folded down flat upon the top of the strip 50, so that at these points there is a double thickness of stock.

At the fourth station D, the completed washer 55 is blanked out of the strip and is stacked up on top of the washers 55 that have already been formed and blanked out. After several thousand washers 55 have been formed and stacked on top of each other, they are separated into stacks of the desired height, and each stack is mounted on a stem 56, as shown in Fig. 8, between a thick solid bottom washer 57 and a thick top washer 58. The top washer 58 has the same shape in plan as the other washers 55, but the tongues are short and are not folded over, and the stem 56 has two fins 59 whose edges fit into the notches 53 on the inside of the washers. The upper corners 60 of the fins 59 are peened over a little to keep the washers from sliding off when the filter stack 61 is removed from the rest of the filter, as when it is being cleaned.

Apart from the filter stack 61, the filter shown in Fig. 8 is of the standard type that has been in use for many years. It comprises a head 62 having a flat recessed seat 63 on its under side. The top washer 58 of the filter stack 61 fits against the central part of the seat 63, and a glass bowl or jar 64 and a gasket 65 fit up against the outer part of the seat 63 around the filter stack. The glass bowl 64 is held in place by a stirrup, not shown in the drawing, that hooks under it and that has a tightening screw fitting into a recess 66 on the top of the filter head 62 for pulling the glass bowl 64 up tightly against its gasket 65. The head 62 is formed with an inlet passage 67 that opens down into the space between the glass bowl 64 and the filter stack 61, and with an outlet passage 68 that leads from the center of the filter stack 61, so that liquid passing through the filter must pass through the filter stack.

The filter stack allows liquid to pass through and filters it in the same way as other forms of metal-edge filters. As shown most clearly in Fig. 9, the successive washers 55 are held spaced from each other by the spacers or tongues 52, so that narrow slits 69 are left between the washers. These slits let the liquid flow through freely, but they stop all particles of dirt that are larger than the width of the slits. If the washers are made from stock .002 in. thick, all particles of dirt larger than .002 in. will be stopped by the filter.

Figures 9, 10, 11, 12:
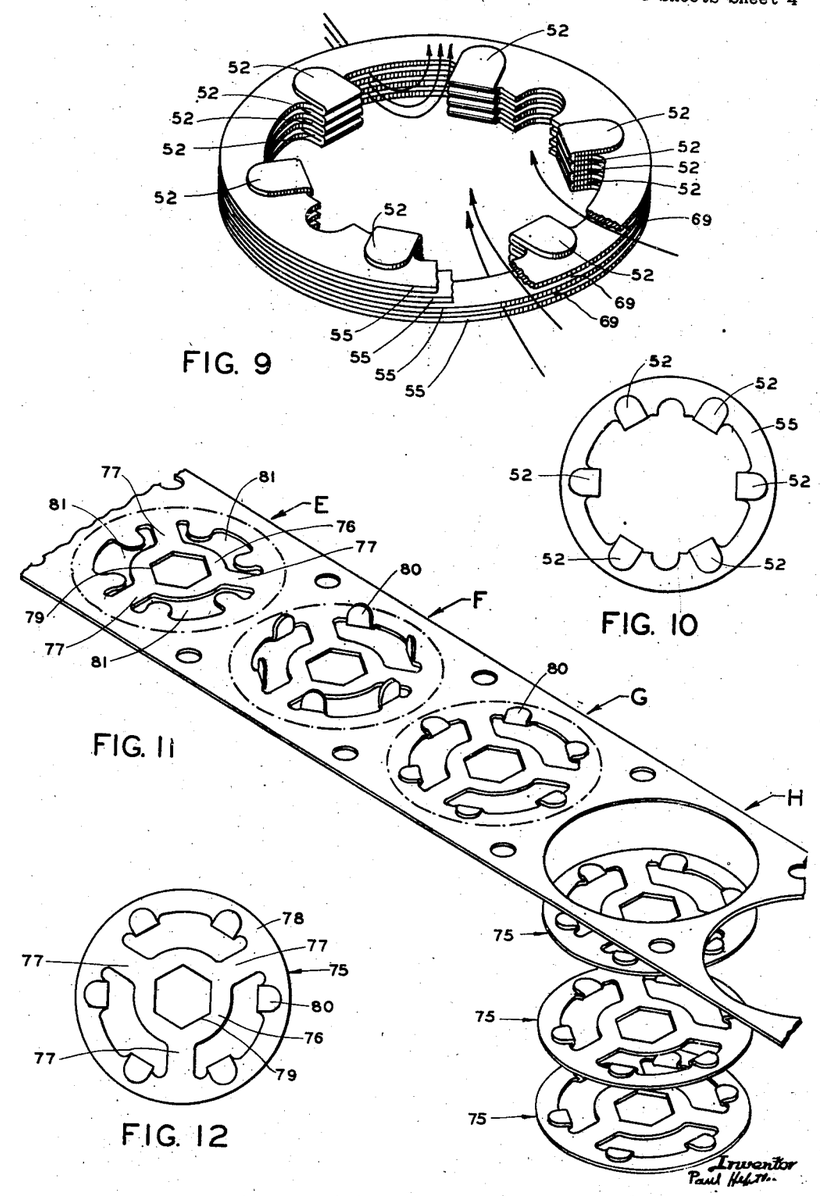
Fig. 9 is an isometric view, partly broken away and on an enlarged scale, of four layers formed as illustrated in Fig. 7 and assembled to form a portion of a filter stack.
Fig. 10 is a plan view of one of the layers made as illustrated in Fig. 7.
Fig. 11 is an isometric view illustrating the successive steps in making and stacking layers for a third form of filter stack.
Fig. 12 is a plan view of one of the layers made as shown in Fig. 11.

A third form of washer and the process of making it are shown in Figs. 11 and 12. The chief difference between the washers 75 made as shown in these figures and the washers 55 made as shown in Figs. 7 to 10 is that the washers 75 have a center or hub 76 joined by three spokes 77 to the rim 78 of the washer instead of having notches on the inner edge of the rim. The hub 76 has a hexagonal hole 79 which receives a hexagonal stem similar to the hexagonal stem 42 in the filter stack shown in Fig. 6. The spacing of the washers is done by the folded-over tongues 80 as in the form of filter stack illustrated in Figs. 7 to 10.

The washers 75 are formed in practically the same way as the washers 55 shown in Figs. 7 to 10, the only difference being that, at the first station E, a pattern of holes 79, 81, 81 and 81 is punched out to form the hub 76 and the three spokes 77 instead of a single hole being punched out. At the other stations F, G and H, the same operations are performed as at the corresponding stations B, C and D in forming the other washers 55.

The process as illustrated in Figs. 7 and 11 may be carried out in progressive die sets having one or more stations for each step of the process. When the process is thus carried out, the die set is arranged to punch pilot holes 83 at or before the first station, and pilot pins are provided at a subsequent station for accurately registering the strip at the successive stations. A detailed description of the die set for carrying out this process is unnecessary, as how such a die set should be made will be obvious to any skilled die maker.

The only portions of the die set which might need any description at all are the portions which carry out the operations of bending the tongues 52 at the stations B and C. At the station B, an upper die member or anvil comes down on top of the strip and backs up that portion of the strip which is to remain flat and a lower die member is arranged to thereafter come up and bend up the ends of the tongues 52.

The portion of the die set which bends the upstanding ends of the tongues 52 down flat upon the stock 60 should preferably perform this operation in two steps and at two separate stations or sub-stations. At the first station a punch having a frusto-conical end is provided to come down inside of the upstanding tongues 52 and to bend them out to an angle of approximately 45 degrees. At the second sub-station a punch with a flat bottom comes down and bends them down flat.

Figure 13:
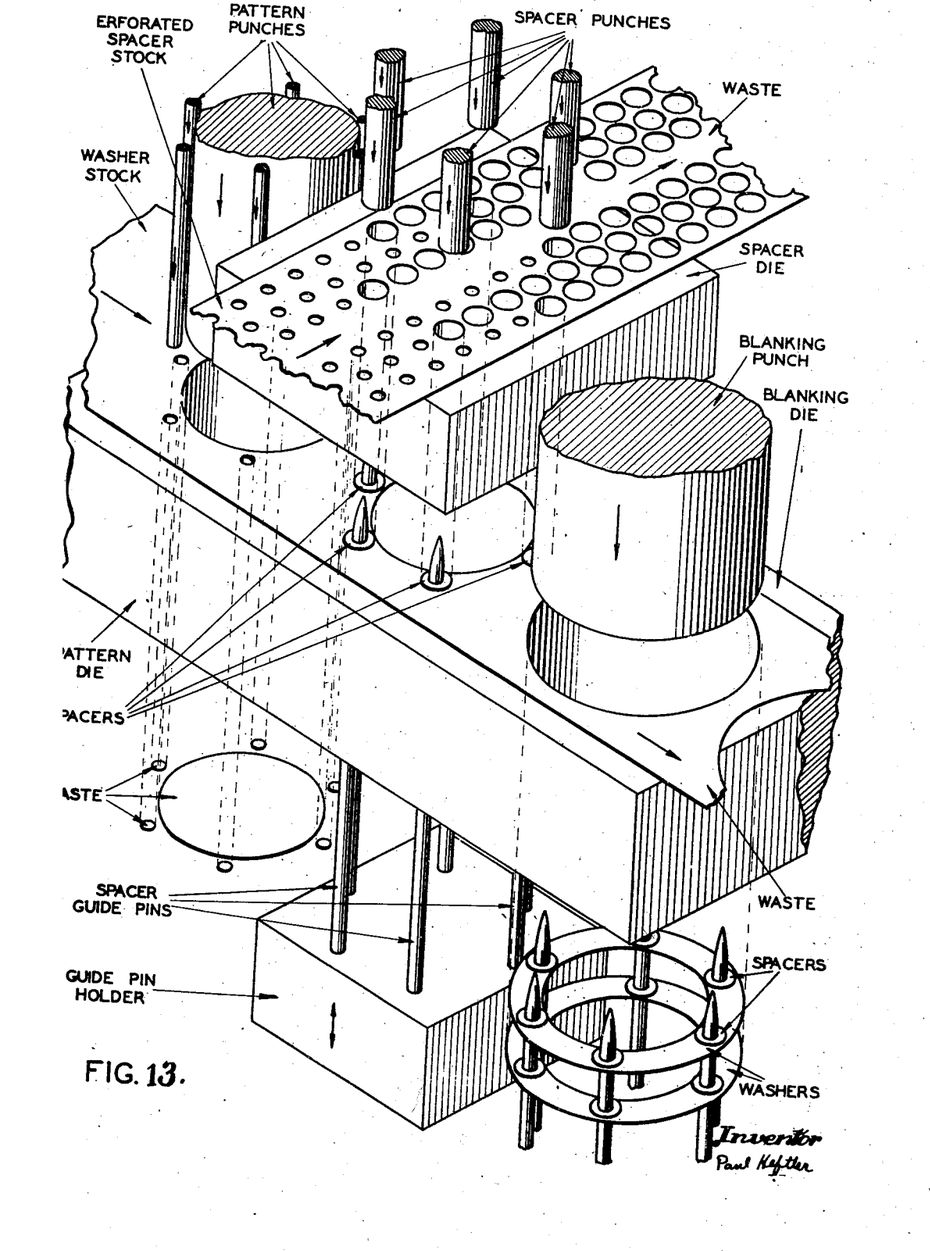
Fig. 13 is a diagrammatic isometric view illustrating still another form of the invention.

Another way of carrying out the invention is illustrated in Fig. 13. In this form of the invention, as may be seen from the drawings, two strips of stock are used, one to form the washers and the other to form the spacers. The washers are in the form of rings having six holes spaced evenly around their circumference, and the spacers are in the form of much smaller washers placed with their holes in registry with the holes in the large washers.

Although the parts of the die set have been shown widely separated vertically in the drawings, they will, of course, be placed much closer together so that there will be no opportunity for the spacers or the washers to fall anywhere but on the guide pins provided. The guide pin holder which carries the spacer guide pins at the central station moves up and down during every cycle of operations, moving up to the position shown in order to line up the spacers which are then being punched out and moving down out of the holes in the spacers and in the washer stock in order to allow the washer stock to be moved forward from one station to the next.

The guide pins which receive the completed washers and spacers extend well up into the blanking die, and the end of the blanking punch is provided with six apertures into which the guide pins can project when the blanking punch moves down into the blanking die.

In operating the die set shown in Fig. 13, the under side of the spacer stock may be coated with thick, sticky grease in order that the spacers will remain in position on the washer stock as the washer stock is moved from one station to the next. This grease also holds the spacers in position when the stack is being transferred from the guide pins at the final station in the die set to the pins forming a part of the finished filter stack.

The finished filter stack comprises a heavy top washer having the same shape as the washers shown in the drawings and a heavy disc-like bottom washer having apertures arranged like the six small apertures in the washers shown in the drawings. The washers and spacers produced in the die set are located between these top and bottom washers, and pins extend slidably through the holes in all of the washers and have their ends peened over to hold the parts in assembled relation. The filter stack is held in position on the under side of a filter head by a small stud fixed to the filter head and extending down through the center of the stack and through a small hole in the bottom washer, a nut being provided on the stud below the bottom washer to hold the stack up in place. Thus the stack can be readily removed from the filter head, whereupon it will loosen up and be readily cleaned.

While the above disclosure contains all that is necessary to enable a skilled die maker to practice the invention in its many forms, it is obvious that, in practice, die sets made according to the above disclosure would contain many elements not shown that would be desirable or perhaps even necessary. For instance, in every die set, pilot hole punches and pilot pins should be provided to secure accurate indexing of the stock so that the blanking punch will register exactly with the previously punched out pattern. Likewise, pressure pads sliding on the punches should be provided to clamp the material solidly onto the die while the punches do their work. No attempt has been made to illustrate or describe these refinements, because their addition to the drawings and specification would serve only to make the invention less readily grasped.

While only five specific forms of the invention have been shown and described, the broad basic invention can obviously be carried out in many other ways, of which some will be obvious to the skilled mechanic and others will involve further invention. The patent therefore not only covers the specific forms of the invention shown and described, but it would also be infringed by any other process of making filter stacks or by any other die set that would fall within any one or more of the following claims or definitions of the invention.

The broad inventions described in this specification and defined in the broader claims below were first disclosed in the specific forms of the invention described in my earlier patent application Serial No. 129,326, filed on March 6, 1937. The application of which this specification is a part therefore stands as a division of that earlier application, as far as the broad inventions as well as some of the specific inventions are concerned, and it is known technically as a "continuation in part." The record date of the inventions defined in the broader claims is therefore March 6, 1937, even though some of the specific forms of those inventions, such as those shown in Figs. 7 to 13, were not invented until later.

I claim:

1. A die set for making filter stacks, comprising a punch and die for forming one pattern in a strip of sheet stock, a second punch and die for forming a different pattern in another strip of sheet stock, and a blanking punch and die adapted to receive the two strips one above the other and to blank washers out of both strips one on top of the other.

2. A die set as recited in claim 1 and in which the blanking die is adapted to receive the two strips of sheet stock in contact with each other.

3. A die set for making metal-edge filter stacks, comprising a lower set of punches and dies constructed and arranged to punch a pattern of holes in a strip of stock at one station and to blank out the portion of the strip bearing the pattern at another station to form a washer, and an upper set of punches and dies adapted to form and punch out spacers from a second strip of stock, the upper set of punches and dies being located above the first strip of stock so as to drop the spacers onto the portion of the first strip having the pattern punched out before that portion is blanked out so that the spacers will be in position on the washer when it is blanked out.

4. A die set as defined in claim 3 and having means for guiding the spacers down into position on the first strip of stock.

5. The method of making a filter stack which comprises stamping a series of identical patterns in a strip of stock, stamping a second series of identical patterns different from the first in a second strip of stock, placing the patterns of the first series successively adjacent a stack assembling position, placing the patterns of the second series successively adjacent the stack assembling position and successively in registry with the patterns of the first series so as to form therewith successive pairs of patterns, and blanking out the pairs of patterns and transferring them to the stack assembling position one after another.

6. The method of making a filter stack which comprises stamping a series of identical patterns in a strip of stock, stamping a second series of identical patterns different from the first in a second strip of stock, placing the patterns of the first series successively adjacent a stack assembling position, placing the patterns of the second series successively adjacent the stack assembling position and successively in registry with the patterns of the first series so as to form therewith successive pairs of patterns, and blanking out the pairs of patterns and transferring them to the stack assembling position one after another.

7. A method as recited in claim 6 and in which the patterns of one series are in contact with the patterns of the other series when they are in registry.

8. The method of making an edge-type filter stack which includes the steps of taking a strip of thin sheet metal, moving the strip longitudinally step by step through at least two stations, the distance moved at each step being equal to or being a submultiple of the distance between stations, punching out a part of the strip at one station to form at least one hole therein, the part punched out coming from within an imaginary outline and leaving portions projecting in from said outline and also leaving segments within said outline between and joining the outer ends of said portions, forming thin metal spacing means and placing the spacing means within said outline and in registry with said portions, blanking out the piece of the strip within said outline at the last of the stations to form a washer, the washer carrying the spacing means with it, repeating the above mentioned operations at the same stations each time that the strip is moved one step, and piling up the successively blanked out washers with their spacing means on top of each other in a stack with the holes in line with each other to form at least one vertical passage for the filtered liquid and with the spacing means on each washer directly above those below to form solid pillars in the stack, the spacing means holding at least a portion of the edges of the successive washers apart to provide narrow slits on the outside of the stack through which liquid may filter and flow to the vertical passage.

9. The method of making a metal-edge filter which comprises punching a hole in a strip of thin sheet metal stock, said hole having tongues of stock projecting in from its periphery, bending said tongues over onto the stock around said hole, blanking out a washer containing said hole and bearing said tongues, repeating the above operations to form a plurality of identical washers, and piling said washers into a stack as they are formed.

10. The method of making a metal-edge filter stack which includes the steps of taking a strip of thin sheet metal stock of uniform thickness, moving the strip step by step past at least two stations, the distance moved at each step being equal to or a submultiple of the distance between stations, punching out a pattern of holes in the strip at one station after each movement of the strip, each pattern including a central hole and several other holes spaced around it, all of the holes lying within a circle, placing flat spacing means on one side of the strip within the circle at a subsequent station after each movement of the strip, the spacing means being placed so that it leaves at least one hole unencircled, blanking out each part of the strip lying within the circle surrounding a pattern of holes and having spacing means on one of its sides, the blanking out being done at one of the stations and after each movement of the strip, and placing each of the blanked-out parts with its spacing means on top of the previously blanked-out parts and their spacing means to form a filter stack.

11. A method as described in claim 10 and in which the spacing means are held in position flat on one side of the strip from the time that they are placed there until at least the time that the parts bearing the spacing means are blanked out and in which each part and its accompanying spacing means are held in registry with the previously blanked out parts and their accompanying spacing means immediately after being blanked out.

12. A method as described in claim 10 and in which the spacing means are held in position flat on one side of the strip by a sticky substance such as grease.

13. The method of making an edge-type filter stack which includes the steps of punching a hole in a strip of thin sheet metal, forming a spacer and placing it in position on one side of the strip next to the hole so as to neither cover nor encircle the hole, blanking out the part of the strip having the hole after the spacer is in position, the part thus blanked out including the spot where the spacer is, and placing the part blanked out and its accompanying spacer on top of previously blanked-out similar parts and spacers to form a filter stack.

14. The method of making an edge-type filter stack which includes the steps of punching a pattern of holes in a strip of thin sheet metal, forming a spacer and placing it in position on one side of the strip next to the holes so as to leave at least one hole uncovered and unencircled, blanking out the part of the strip having the holes after the spacer is in position, the part thus blanked out including the spot where the spacer is, and placing the part blanked out and its accompanying spacer on top of previously blanked out similar parts and spacers to form a filter stack.

15. The method of making an edge-type filter stack which includes taking a strip of thin sheet metal stock, moving the strip step by step past at least two stations, punching out a pattern of holes in the strip at one station after each movement of the strip, placing spacers against one side of the strip at a subsequent station after each movement of the strip, the spacers being placed next to the previously punched holes so as to leave at least one hole uncovered and unencircled, blanking out the parts of the strip having the holes and the spacers at one of the stations after the station at which the holes are punched, and placing each of the blanked-out parts with its spacers on top of the previously blanked-out parts to form a filter stack.

16. The method of making an edge-type filter stack which includes the steps of punching a pattern of holes in a strip of thin sheet metal, the pattern including a central hole and other holes around it and all lying within a circle, placing spacing means on one side of the strip within the circle, the spacing means being placed so as to leave at least one hole uncovered and unencircled, blanking out the part of the strip within the circle while the spacing means is in position, and placing the spacing means and washer thus formed on top of similar spacing means and washers previously blanked out to form a filter stack.

17. The method described in claim 10 and in which the blanking out is done at the same station at which the spacing means are placed in position.

18. The method described in claim 13 and in which the spacers are held in position on the strip of thin sheet metal by a soluble adhesive.

19. The method of making an edge-type filter stack which includes the steps of taking a strip of thin sheet metal, moving the strip step by step through at least two stations, the distance moved at each step being equal to or being a submultiple of the distance between stations, punching out a pattern of holes in the strip at certain of the stations, the pattern comprising a series of curved holes arranged in a ring and at least one other hole, forming thin metal spacers and placing them upon the strip at the ends of the curved holes at another station, blanking out a circular piece of the strip at the last station, the piece blanked out having all of the holes and carrying the spacers upon it and its edge being concentric with the ring of holes, repeating the punching and the spacer-forming-and-placing operations at the same stations each time that the strip is moved one step, and piling up the successively blanked-out pieces and their spacers on top of each other in a stack with the curved holes in line with each other to form vertical passages for the filtered liquid and with the other holes in line with each other to receive means for holding the stack together and with the spacers on each piece directly above those below to form solid pillars in the stack, the spacers holding at least a portion of the edges of the successive pieces spaced apart to provide narrow slits on the outside of the stack through which liquid may filter and flow to the vertical passages.

20. The method of making a metal-edge filter stack which includes the steps of providing a strip of thin sheet metal having a portion partially formed into a filter washer, said portion having thin sheet metal spacing means lying against one side thereof and having a hole adjacent the spacing means, the spacing means neither covering nor encircling the hole, blanking out the portion of the strip having the hole after the spacer is in position and the hole is formed, and placing the blanked-out portion with its spacer on top of previously blanked-out similar portions and spacers to form a filter stack.

21. The method of making a metal-edge filter stack which comprises the steps of (1) forming a thin sheet metal spacer and placing it in position on one side of a strip of thin sheet metal stock and punching a hole in the stock next to the position of the spacer, the spacer neither covering nor encircling the hole, then (2) blanking out the part of the strip having the hole and the spacer, and finally (3) placing the part blanked out with its spacer on top of previously blanked-out similar parts and spacers to form a filter stack.

22. The method of making an edge-type filter stack as described in claim 13 and in which the punching of the hole and the forming of the spacer are done simultaneously, the spacer comprising a tongue formed from the strip of metal by the punching out of the hole around it, and in which the spacer or tongue is placed in position by being bent over onto the main portion of the strip.

PAUL HEFTLER.